United States Patent [19]

Jensen

[11] Patent Number: 4,861,606

[45] Date of Patent: Aug. 29, 1989

[54] METHOD OF ADDING LIQUID SUBSTANCES TO PRODUCTS MADE BY EXTRUSION

[76] Inventor: Finn N. Jensen, Skyttevaenget 44, Esbjerg V, Denmark, 6710

[21] Appl. No.: 149,225

[22] PCT Filed: May 26, 1987

[86] PCT No.: PCT/DK87/00062

§ 371 Date: Feb. 24, 1988

§ 102(e) Date: Feb. 24, 1988

[87] PCT Pub. No.: WO87/07116

PCT Pub. Date: Dec. 3, 1987

[30] Foreign Application Priority Data

May 26, 1986 [DK] Denmark .............................. 2447/86

[51] Int. Cl.$^4$ ................................................ A23B 4/10
[52] U.S. Cl. .................................... 426/305; 426/307; 426/516
[58] Field of Search ............... 426/448, 512, 516, 296, 426/302, 305, 307; 99/516, 534

[56] References Cited

U.S. PATENT DOCUMENTS

| | | | |
|---|---|---|---|
| 2,806,788 | 9/1957 | Leker | 99/534 |
| 3,650,766 | 3/1972 | Smadar | 426/296 |
| 4,208,476 | 6/1980 | Tsao | 426/512 |
| 4,454,804 | 6/1984 | McCulloch | 99/516 |

*Primary Examiner*—George Yeung
*Attorney, Agent, or Firm*—Fleit, Jacobson, Cohn, Price, Holman & Stern

[57] ABSTRACT

In products such as fodder pellets made by extrusion of aqueous basic material which at a temperature higher than the boiling point of water is extruded through nozzles of an extruder mouth piece, addition of liquid substances such as for example fat can be carried out by spraying of or immersion into the substances concerned in such a way that the decreasing pressure in the steam-filled cavity of the material during cooling outside the extruder is utilized to overcome the flow resistance of the liquid additives during their inward travel from the surface of the basic material.

2 Claims, No Drawings

METHOD OF ADDING LIQUID SUBSTANCES TO PRODUCTS MADE BY EXTRUSION

The present invention relates to a method for addition of liquid substances to products such as fodder pellets made by extrusion where aqueous basic material at a temperature above the boiling point of water is extruded through the nozzles of an extruder mouth piece.

For the extrusion of such products as for example fodder and foodstuffs the basic material is fed to a cylindrical housing and passing through it towards a mouth piece with one or more nozzles by one or two worms rotating in the housing. Having passed through the nozzles the extruded material can be cut by knives into pieces, pellets, of a suitable length.

In an extruder with two worms these are designed so that in combination with the housing they constitute a pump with positive displacement. Such an extruder can, therefore, work at a high pressure and independently of the interior friction of the material so that fat and corresponding materials can be added to the basic material prior to extrusion. However, the double worms have to be made and installed with great precision, and this type of extruder is, therefore, relatively expensive.

An extruder with only one worm is simple and correspondingly cheap, but works at a relatively low pressure which is determined especially by the viscosity and structure of the basic material. When the viscosity is reduced, a tendency to internal return flow causes a limitation of the amount of additives, especially fat, which can be added to the basic material prior to extrusion.

To obtain a higher fatty content in the finished pellets than is normally possible by means of a single-worm extruder, a certain amount can be added to the finish-extruded pellets through the surface, either by spraying or in a rotary coater drum.

It is thus not possible to obtain a homogenous product in this way as saturation of surface pores impedes transport of liquid to the core material. The inward travel of the liquid effected by capillary forces as motive power will be opposed by a growing pressure from the air to be ousted through the fat-saturated outer layer. In many cases it will, therefore, be impossible to make products with a desired fatty content.

These drawbacks are avoided according to the present invention by the addition of the liquid substances being effected by spraying of or immersion into the substances concerned in such a way that the decreasing pressure in the steam-filled cavity of the material during cooling outside the extruder is utilized to overcome the flow resistance of the liquid additives during their inward travel from the surface of the basic material.

With this procedure the addition, therefore, takes place under conditions which do not involve the need for replacement of air as with the method used so far, where on the assumption that the material would otherwise become loose and crumbling the extruded pellets have been allowed to cool considerably before the addition. With the method according to the invention where addition is, therefore, made immediately after the extrusion, a pressure gradient will, on the other hand, supplement the capillary effect so that a rate of absorption can be obtained which corresponds to what can be obtained with a double-worm extruder.

During passage of the material through the extruder nozzles the pressure drops, thus converting the water content in the material abruptly from liquid to steam phase. This results in an expansion caused by the evaporation of the water particles whereby a lot of steam-filled pores are created. During this cooling which is initiated immediately after the material has left the mouth piece, the steam will re-condense. A vacuum is thus created in the material which will draw simultaneously added additives towards the core of the pellets.

Addition of substances—fat or other liquids—can, of course, be made in the manner described irrespective of the type of extruder used when only the assumed pressure and temperature sequences make it possible.

What is claimed is:

1. A method of adding an additive substance in liquid form to products comprising extruded foodstuffs and fodder pellets, which method comprises:

extruding an expandable aqueous basic foodstuff material, at a temperature higher than the boiling point of water and at a pressure sufficient to maintain the water in said expandable aqueous foodstuff material in its liquid phase, through a nozzle of an extruder mouthpiece to form an extrudate, whereby in passing through and out of said nozzle the pressure in said aqueous basic product material extrudate is rapidly lowered, and thus rapidly converting the water in said aqueous basic material into its steam phase resulting in a simultaneous expansion of said extrudate caused by evaporation of said water therein;

immediately after extrusion of said aqueous basic product material extrudate from said nozzle and the simultaneous expansion of said extrudate, spraying an additive substance in liquid form onto the surface of said extrudate for coating said surface therewith; and immediately after coating said extrudate with said additive substance in liquid form, cooling said coated extrudate to promote absorption of said coating inwardly into said extrudate, whereby, during cooling of said coated extrudate, condensation of steam trapped therein creates a vacuum therewithin drawing said coated liquid additive thereinto towards the core thereof under a pressure gradient between said vacuum and the ambient temperature.

2. A method of adding an additive substance in liquid form to products comprising extruded foodstuffs and fodder pellets, which method comprises:

extruding an expandable aqueous basic foodstuff material, at a temperature higher than the boiling point of water and at a pressure sufficient to maintain the water in said expandable aqueous foodstuff material in its liquid phase, through a nozzle of an extruder mouthpiece to form an extrudate, whereby in passing through and out of said nozzle the pressure in said aqueous basic product material extrudate is rapidly lowered, and thus rapidly converting the water in said aqueous basic material into its steam phase resulting in a simultaneous expansion of said extrudate caused by evaporation of said water therein;

immediately after extrusion of said aqueous basic product material extrudate from said nozzle and the simultaneous expansion of said extrudate, immersing said extrudate in an additive substance in liquid form for coating the surface of said extrudate with said additive substance in liquid form; and immediately after coating said extrudate with said additive substance in liquid form, cooling said coated extrudate to promote absorption of said coating inwardly into said extrudate, whereby, during cooling of said coated extrudate, condensation of steam trapped therein creates a vacuum therewithin drawing said coated liquid additive thereinto towards the core thereof under a pressure gradient between said vacuum and the ambient temperature.

* * * * *